Jan. 28, 1964  J. RABINOW ETAL  3,119,488
CONVEYOR SYSTEM AND CART

Filed March 28, 1962  3 Sheets-Sheet 1

INVENTORS
Jacob Rabinow
Robert G. Brown
BY
Joseph A. Genovese &
Max L. Libman
ATTORNEYS INVENTORS
Jacob Rabinow
Robert G. Brown
BY
Joseph A. Genovese &
Max L. Libman
ATTORNEYS

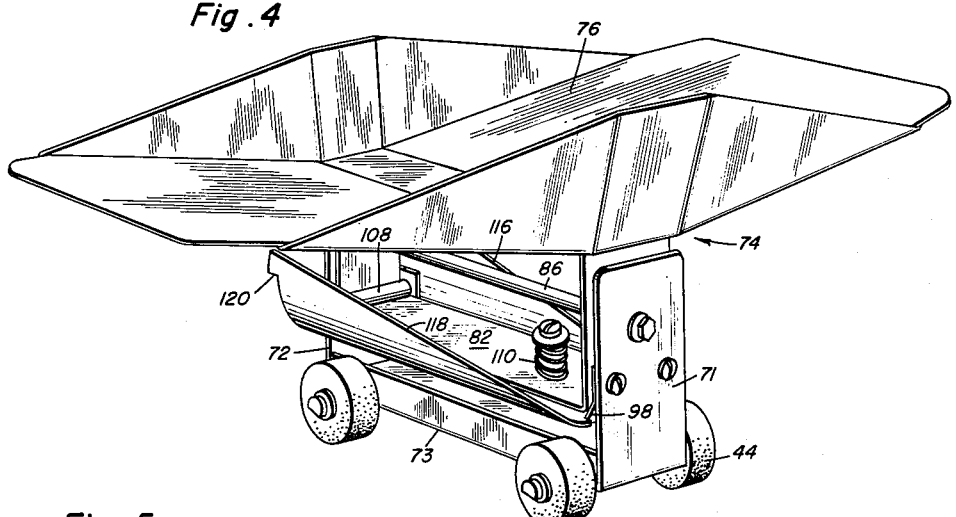
Fig. 4
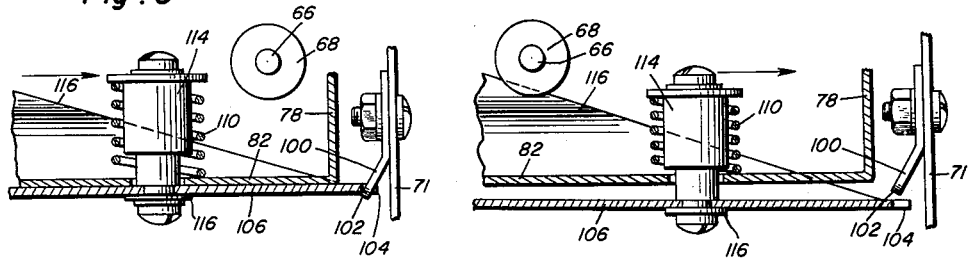
Fig. 5
Fig. 5a
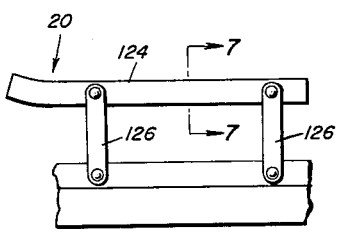
Fig. 6
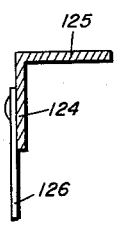
Fig. 7
INVENTORS
Jacob Rabinow
Robert G. Brown
BY
ATTORNEYS

United States Patent Office 3,119,488
Patented Jan. 28, 1964

3,119,488
CONVEYOR SYSTEM AND CART
Jacob Rabinow, Bethesda, and Robert G. Brown, Clarksville, Md., assignors to Rabinow Engineering Co., Inc., Rockville, Md.
Filed Mar. 28, 1962, Ser. No. 183,216
6 Claims. (Cl. 198—146)

This invention relates to conveyor systems and especially to conveyor carts forming a part of a complete system.

Conveyor systems have become a necessary part of high-speed material and article handling procedures. Conveyor design is usually varied to suit the articles and/or materials, the nature of the manufacturing, of sorting, processing, etc. and for other reasons. Our invention is particularly concerned with improvements in conveyor systems where articles, materials, etc., are carried along a conveyor line by means of carts or the equivalent. We have a system which relies on a tipping cart to unload the contents of the carrier, and the unloading action is either to the left or to the right of the cart as it moves in a constrained path of travel.

Tipping conveyors are well known in the art. For example, U.S. Patent No. 2,872,056 and No. 2,969,137 and 3,034,665 disclose conveyor systems for articles supported on pans, and the pans are tipped to discharge the articles as the conveyor operates. The earlier patent discloses a conveyor where the pan of the cart is capable of tiliting in one direction only, but the later patents show how the pan may be made in sections to tilt either to the left or the right depending on whether the article is to be discharged into a left station or into a right station with respect to the conveyor line.

In our invention we have a cart with a pan capable of tilting right or left for discharge of the pan-contents in corresponding directions. The pivot axis of the pan is in the same place for either left or right tilting and the preferable location of the pivot axis is in a vertical plane passing through the centerline of the cart and parallel to the direction of motion of the cart. Thus, our pan which serves as a portion of the article carrier, is an over-center device. This has the advantage of being easily tilted, since (assuming center-loading which is discussed later) the article carrier will tend to tilt as soon as the pan is slightly pivotally moved to the left or the right of the over-center position.

Accordingly, an object of our invention is to provide a conveyor system where the articles discharge either left or right from an article carrier which is capable of tilting in either of these directions about a pivot axis which is preferably in a vertical plane approximately coincident with the plane of the longitudinal center line of the cart.

Another object of the invention is to provide a conveyor cart with an improved tilting action as discussed above.

As we mentioned previously, our conveyor system is certainly not the original tilting conveyor, and we have not invented the first conveyor cart to be used in a conveyor system. However, our system provides ease of operation, flexibility and is an improvement over all previous systems of which we are aware. In a large part this is made possible by the simplicity of our cart and its favorable tilting action. The article carrier of our cart is retained in an over-center position with respect to the pivot axis of the article carrier by an exceedingly simple latch with latch members engaged between the frame of the cart and a part of the article carrier. One of the latch members is fixed to the frame of the carrier and the other is movable with the carrier and also movable with respect thereto. Accordingly, to both release the latch and start the initial (or full) tilting operation, we require only two projections such as cams which project laterally outwardly from the article carrier-supported latch member. Upon initial engagement of one of the cams, for example by a wayside abutment, the cart latch is first released and then the article carrier is tilted in the article-discharge direction. The latch releasing operation and tilting operation are smooth and continuous. In addition, it is equally simple to tilt the article carrier left or right (by using a left or right interposing abutment which engages the left or right cam), and all tilting motions of the article carrier are symmetrical about the same pivot axis of the article carrier.

Since the latch and pan tilting mechanism of our cart require a small number of moving parts, our cart is inherently quiet, simple, and far less subject to wear than more complex systems. Therefore, another object of our invention is to provide a very simple cart which has a smooth operating and simplified latch and tilt action and where the motions of the carrier are symmetrical to the left or right about the same pivot axis.

Other objects and features of importance will become apparent in following the description of the illustrated form of the invention.

FIGURE 4 is a perspective view of our cart.

FIGURES 5 and 5a are diagrammatic views showing the latch of our cart in its operation.

FIGURE 6 is an elevational view taken on line 6—6 of FIGURE 1 and showing one method of restoring all carriers of all of the carts to an initial article-supporting position when they pass a given point in the conveyor system.

FIGURE 7 is an enlarged detail view taken on line 7—7 of FIGURE 6.

Figure 1:
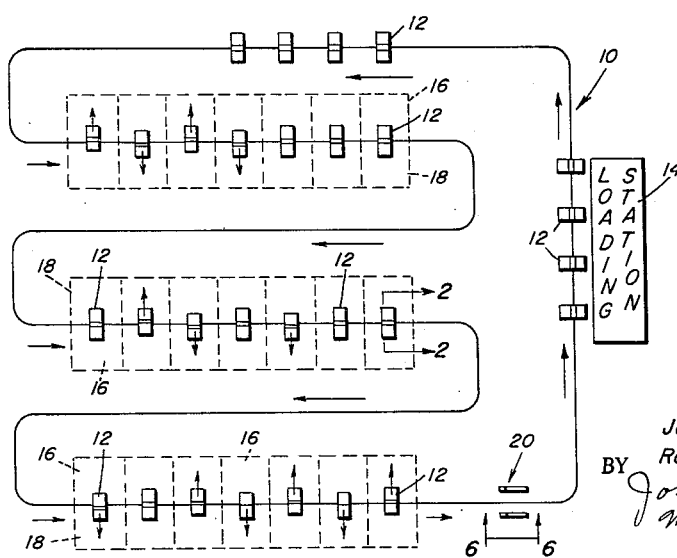
FIGURE 1 is a diagrammatic top view of a typical conveyor system in accordance with our invention.
Figure 2:
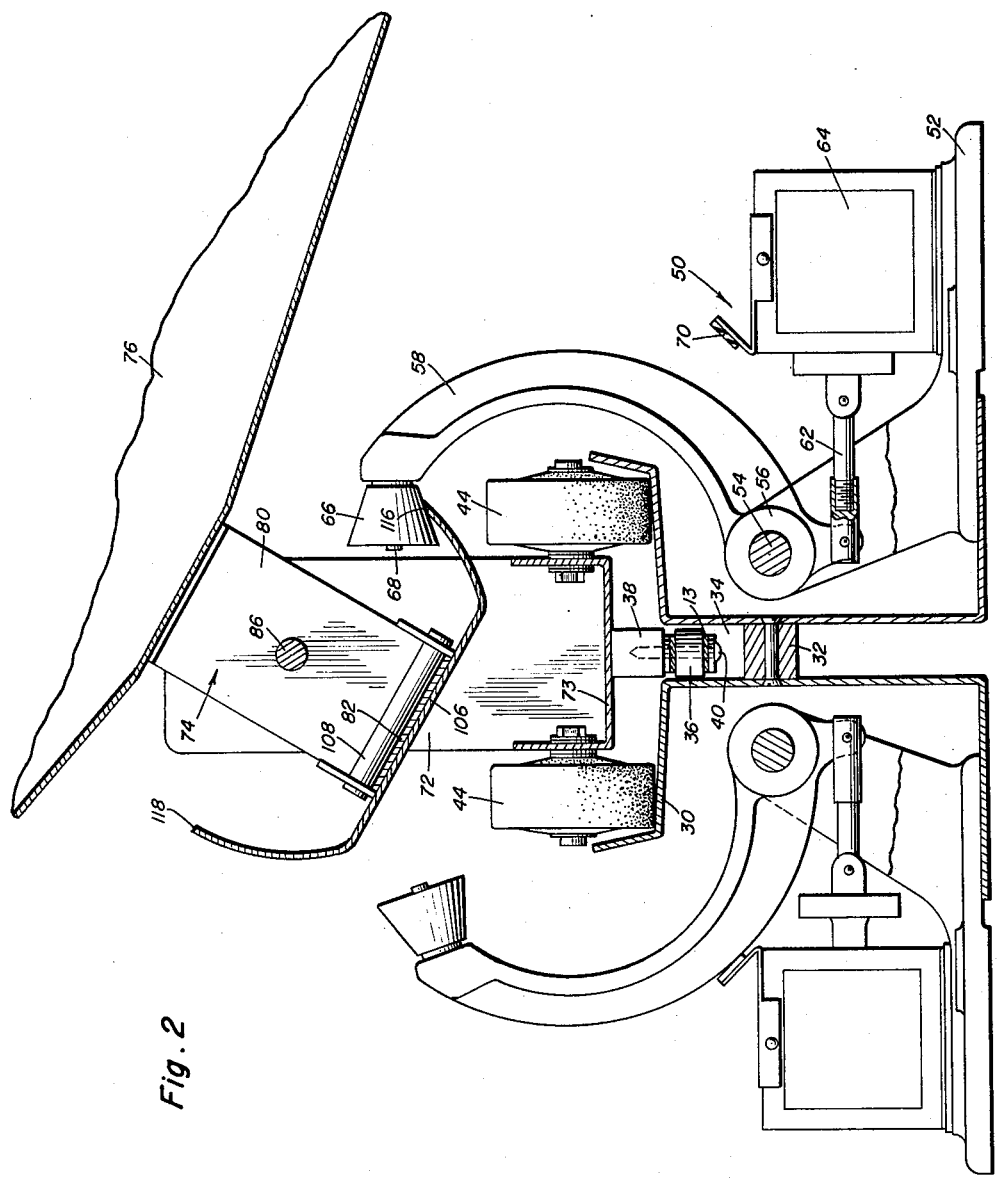
FIGURE 2 is an enlarged sectional view taken on line 2—2 of FIGURE 1 and showing the conveyor track, one of our carts, and left and right interposers which cooperate with the cart structure to tilt the cart article carrier to the left or right.

In the accompanying drawings FIGURE 1 shows conveyor system 10 which is typical for our conveyor when it is used as a sorting conveyor. The conveyor line includes a plurality of carts 12 interconnected by roller chain 13 (FIGURE 2). The carts (a few of which are shown in FIGURE 1) are manually or machine loaded at the loading station 14 for subsequent distribution along the conveyor line at a selected unloading station 16 at one side of the line or a typical unloading station 18 at the other side of the line. The distribution is made (selection of a particular station 16 or 18) by using any suitable electrical or mechanical programming as referred to in the previously mentioned prior patents or such as referred to in numerous other prior patents. Since the specific programming device forms no part of our invention no details are given herein.

As will be described later, our carts are capable of tilting left or right at any of the individual stations 16, 18 in order to unload the article carriers of the carts. Once the carrier is tilted it can be immediately restored to the initial position but in most cases it is more practical to have one or a few carrier restoring stations 20 to elevate all of the carriers to the erect position, ahead of the loading station 14. Thus, we have shown only one article-carrier erecting device at station 20 in FIGURE 1 (details shown in FIGURES 6 and 7).

The conveyor track (FIGURE 2) 30 can be made in various ways, for instance by a pair of formed sections affording an upper track surface, when attached together by spacers 32 and bolts, welding, etc. Spacers 32 hold the confronting vertical parts of the track sections spaced sufficiently to form channel 34 in which a conventional wheel or roller chain 13 is captive. Mounting brackets or blocks 38 are fixed to the frame of a cart, and these are secured, as by pins, bolts 40 or the like to the roller chain as for example, by having the bolt 40 act as the spindle for one roller 36 of the chain. Thus, the chain is longitudinally moved in its channel 36, all of the carts which are attached to the chain are moved therewith. The wheels 44 of the carts ride on the surface of the track as shown in FIGURE 2. Any conventional means can be used for driving the chain, such as the motor and sprocket shown in U.S. Patent No. 2,667,260.

FIGURE 2 shows a pair of interposers, one located to the left and the other to the right of the track. The interposers are identical, and there is one pair at each unload station 16, 18. Since both interposers are identical, a description of only one interposer 50 is given. It is made of a pillow-block bracket 52 or the equivalent which supports a pivot pin 54, the latter passing through a bearing 56 in a crank arm 58. One end of the arm is coupled by a push-pull rod 62 to the armature of a solenoid 64, and the other end has a truncated conical roller 66 mounted for rotation on an arm-supported spindle 68. Rest 70, consisting of a resilient pad secured (by a bracket) to the solenoid, supports the crank arm 58 when in the withdrawn position (left side of FIGURE 2) and/or acts as a cushion when the crank is solenoid-operated to the withdrawn position. The solenoid is also used to actuate the crank to the position at which roller 66 causes the article carrier 74 of the cart to tilt. The solenoids are actuated at the proper time in accordance with the movement of chain 36 by means of signals obtained from a programmer (not shown).

Figure 3:
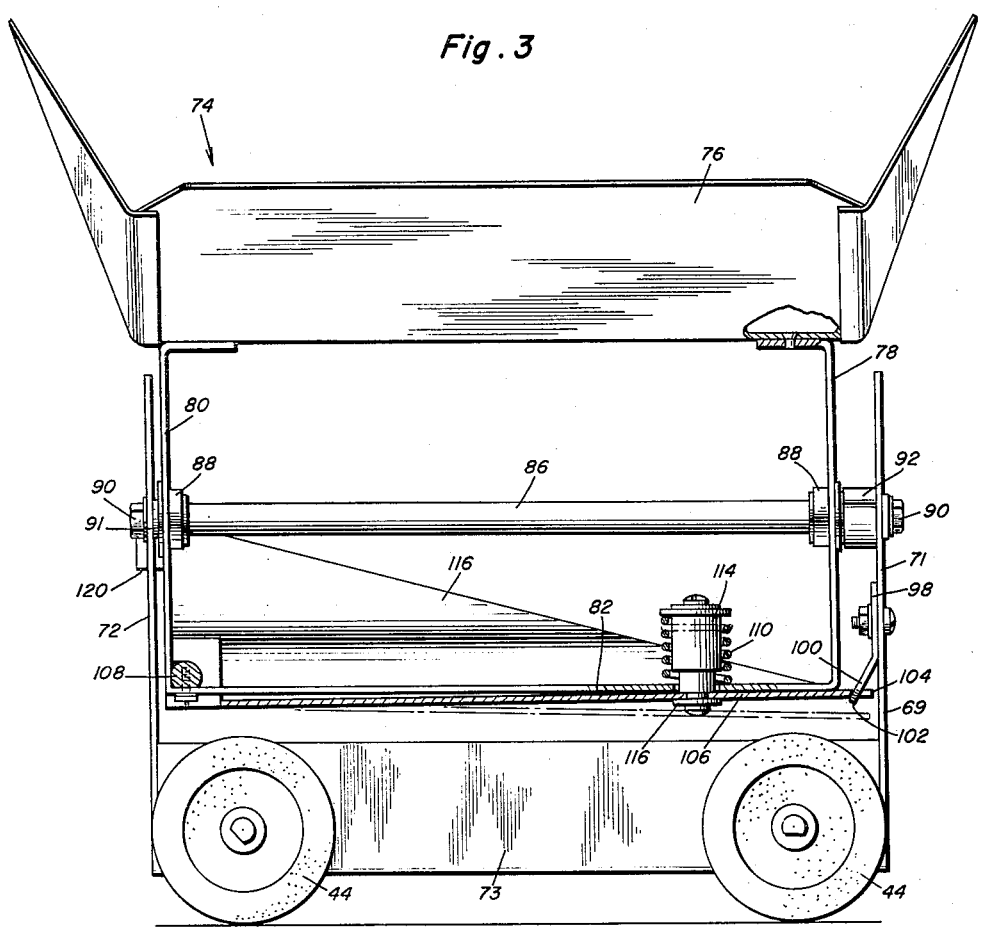
FIGURE 3 is a side view of our cart, shown partly in section and partly in elevation.

Our cart (FIGURES 2–4) is composed of an upwardly opening U-shaped frame having front and rear members 71 and 72 and a bottom member 73 with axle-supported wheels 44. The article carrier 74 consists of a pan 76 fixed to a sub-frame having front and rear members 78 and 80, together with a lower member 82 fixed at its front and rear ends to the lower ends of members 78 and 80. Spindle 86 establishes a pivot axis for the carrier 74, and is located in a vertical plane which is preferably substantially coplanar with the center line of the cart. Conventional bearings 88 are attached in openings in members 78 and 80 and mount the article carrier for free oscillation to the left and right on the spindle 86. The spindle itself is stationarily attached to the frame members 71 and 72, for instance by bolts 90, and there are spacers 91 and 92 on spindle 86 between the confronting faces of carrier members 78, 80 and frame members 71, 72.

When the carrier is in the article-carrying position its center of gravity is approximately over center with respect to the axis of spindle 86. Thus, once the carrier is tilted either to the left or the right a small distance, the remaining travel of the carrier is achieved with a small force since the pull of gravity will then help tilt the carrier. We realize that the load on pan 76 may not be centered so that there will be some unbalance when our cart is used, but even here our system provides advantages. First of all, we incline the sides of the pan (as shown) toward the center line of the cart so that when the load is placed in the pan it will tend to shift to the center of the cart, and this is especially true if our cart is used for supporting granular or fluent substances such as salt, grain, balls, etc. Packages, such as small boxes, bundles of letters, cartons, etc., will not as easily seek the center of the cart but this is not a very serious drawback since the article will usually be loaded near the pan center and furthermore, as soon as the pan begins to tilt, the load will slide over-center and the weight of the load itself will further help to tilt the cart in the desired direction—a feature which is not achieved with prior carts which have left and right tilt axes instead of a single approximate center axis.

Since our cart has the article carrier in at least an approximate over-center position, the latch to hold the cart in this position need not be heavily nor elaborately constructed. Our latch consists of a latch member 98 attached to the frame of our cart, for instance the inner surface of member 72. Latch member 98 has a tongue 100 with rounded corners 102, and the tongue is engaged in notch 104 of latch number 106. Latch member 106 is movable with respect to (FIGURE 5a) and also movable with (FIGURE 2) the article carrier. Specifically, the latch member is composed of an elongate arm connected by hinge 108 at one end to the member 82 of the article carrier. Thus, latch member 106 is capable of hinged movement about the longitudinal axis of the hinge pin of 108. The hinge motion of the latch member (up and down as viewed in FIGURE 3) engages and disengages the latch. After latch disengagement, the article carrier is tilted left or right (see FIGURE 2), and the latch member 106 tilts therewith.

Resilient means retain the latch in the engaged position (FIGURE 5). The resilient means consist of a spring 110 concentrically mounted on a shouldered pin 114. One end of the spring bears against an upper shoulder on the pin and the other end bears against a surface of the article carrier member 82. Thus the pin is lifted upwardly by the force of spring 110 to the fully elevated position established by shoulder 116 bearing against the lower surface of latch member 106. When the latch member 106 is moved downward to release the latch, pin 114 moves downwardly against the yielding opposition of spring 110, and as soon as the downward force on latch member 106 is discontinued, spring 110 returns the latch member to its initial position.

Our cart has means that cooperate with conical rollers 66 (FIGURE 2) to perform two functions (a) release the latch by moving member 106 downward and (b) exert a force on the part of the article carrier beneath spindle 86 to tilt the article carrier from the initial positino (FIGURE 4) to either the left or right (FIGURE 2) unload positions. These means consist of two elongate cams 116 and 118 whose cam surfaces (edges) slope upwardly from the front of the cart toward the rear. Thus, when an interposer roller 66 engages the front edge of the cam (as the cart moves forward), the initial action is to move the latch member 106 downward (FIGURE 5a) to disengage the tongue 102 from notch 104. As the cart continues to move forward (by propulsion chain 36) cam 116 bearing against the roller, exerts a component of force on the lower part of the article carrier tending to turn it about the axis of spindle 86 (FIGURE 2). As seen best in FIGURES 2 and 4 the cams 116 and 118 have their edges configured as a small portion of a long spiral. As the article carrier tilts while the entire cart continues to move forward there will always be sufficient cam-to-roller 66 contact until the cart moves completely to the unload position. The fully tilted position of the article carrier is established by stop 120 at the trailing edge of each cam engaging an edge of the frame member 71. When a cart is fully tilted either right or left, the clearance between the pan 76 and all other parts of the cart is such as to allow the cart to move past all subsequent left and right interposers at the succeeding stations of the conveyor system.

As we have previously indicated, it is possible for us to restore the article carrier 74 to the erect position immediately after it discharges its contents. In most systems, however, this is unnecessary and therefore we have shown only one carrier-erecting station 20 at which there are two cams 124 (FIGURES 1 and 6), one secured, as by brackets 126, on each side of the track. The cams have an upper flange 125 (FIGURE 7) which engages the raised cam 116 or 118 to apply a downward force thereto (as the cart moves forward)

which pivots the carrier 74 to its initial position at which latch is automatically engaged.

The latch is automatically engaged in the following way: As the article carrier 74 approaches the erect position, the lower edge of tongue 100 bears against the top surface of latch member 106 to one side of notch 104. As the carrier is moved just a little farther, spring 110 compresses while the latch member 106 hinges downward. Then, as the side edge of notch 104 reaches the rounded corner 102 of the tongue 100, the force of spring 110 snaps the latch member 106 upwardly against the bottom surface of member 82 with the tongue 100 engaged in notch 104. After this the cart will move beyond cam 124 with the article carrier in the erect position ready to be reloaded at station 14.

There are many obvious variations and uses of our invention. For example, the conveyor line shown in FIGURE 1 can have any shape, can be used horizontally or on an incline, etc. The details of the cart can be considerably altered. For example, spring (112) assembly can be substituted by a torsion spring at hinge 108 or the equivalent. We can use our conveyor system and/or cart to distribute, transport, etc. any compatible material for sorting, batching, etc. Accordingly, all variations falling within the scope of the following claims may be resorted to.

What is claimed is:

1. In a conveyor system having an elongate support and a plurality of interposers along the length of said support, selected interposers adapted to be moved from a first position laterally outwardly from the support center-line to a second position closer to said center-line, a plurality of carts, means to propel said carts along said support, each cart including an article carrier adapted to selectively tip left and right to discharge an article in a corresponding left or right direction, a frame, means on said frame to mount the cart on said elongate support, pivot means connecting said article carrier to said frame, a latch having latch members on said frame and said carrier respectively and normally retaining said carrier in an article retaining position, one of said latch members having cam members extending from the front to the rear thereof with respect to the direction of cart motion, said cam members each having an upwardly and rearwardly extending edge forming a cam, said cam projecting laterally outwardly on both sides of said latch member and responsive to engagement of the front edge of said cam with a said interposer when in its said second position and the forward motion of the cart to release said latch and provide at least the initial force to tip said carrier in said right and left directions with the pivotal movements of said carrier being about the same pivot axis for both motions of the article carrier.

2. The system of claim 1 wherein said interposers are positioned on opposite sides of said elongate support and adapted to be selectively moved into the path of travel of a selected cam on either side of the cart to operate said latch and tip said article carrier to the left or right by the cam having a wedge action against said interposing means.

3. In a tipping cart for a conveyor system having interposers, a frame having a front end and a rear end with respect to the direction of cart motion, an article carrier including a support member, said support member and said frame being vertically nested, pivot means connecting said support member to said frame to enable said carrier to be tilted to the left or right from an article carrying position between the two, a first latch member attached to said frame, a second latch member movably attached to said support member and provided with a latch which is engageable with said first latch member to hold said article carrier in one position until the latch is released, a first and a second cam member connected with said second latch member and extending laterally of said frame, each of said cam members having a cam surface, said surfaces sloping upwardly and rearwardly substantially from the front of said article carrier support member to the rear end thereof to provide interposer-engaging surfaces substantially the full length of said support member by which smoothly applied forces over a long possible distance on said surfaces can be applied to said second member owing to the motion of the cart and engagement of one of said interposers with a said surface to first release said latch and then tilt said support member and its attached article carrier.

4. In a conveyor system having a plurality of interposers movable between first and second respective positions, an over-center tipping cart comprising an upwardly opening substantially U-shaped frame, an article carrier having a U-shaped support member nested in said frame, said frame and U-shaped member having front and rear walls with pairs thereof adjacent and substantially parallel, pivot means connecting said pairs of walls thereby mounting said carrier for left and right pivotal movement, a first latch member fixed to a said wall of said frame, a second latch member hinged to said U shaped member near the rear wall thereof and extending forwardly of said U-shaped member and terminating in a latch at the forward end thereof, resilient means reacting on said second latch member and said U-shaped member in a manner such that said latch members are resiliently held engaged, said second latch member provided with a first and a second outwardly projecting cam member extending substantially the full length of said U-shaped member from front to rear thereof, each cam member having an edge defining a smooth cam which is located outwardly and slopes upwardly from the front to the rear of said U-shaped member, said cam surfaces adapted to be selectively engaged by one of said interposers when in its second position which cooperates with the forward motion of the cart to provide a force which first hingedly moves said second latch member to disengage the latch members, and then owing to the slope and length of the cam provides a smoothly applied and gradual tipping force to said carrier to tilt the carrier about the axis of said pivot means.

5. The cart of claim 4 wherein said interposer in said second position is above the portion of the cam surface which it first engages so that said smooth cam forms a wedge with respect to said interposer as the cart moves forward with the result that the said smoothly applied force is in a downward direction.

6. The cart of claim 5 and a stop on each of said cam members, and said stops being engageable with a wall of said frame when said article carrier is tipped to the left or right respectively.

References Cited in the file of this patent

UNITED STATES PATENTS 3,034,665     Speaker _____ May 15, 1962